(12) United States Patent
Valeri et al.

(10) Patent No.: US 10,966,027 B2
(45) Date of Patent: Mar. 30, 2021

(54) AUDIO ADJUSTMENT SYSTEM

(71) Applicant: GM GLOBAL TECHNOLOGY OPERATIONS LLC, Detroit, MI (US)

(72) Inventors: Frank C. Valeri, Novi, MI (US); William Seldon, Highland, MI (US); Glenn Pietila, Howell, MI (US); Benjamin Lannan, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/525,893

(22) Filed: Jul. 30, 2019

(65) Prior Publication Data

US 2021/0037318 A1    Feb. 4, 2021

(51) Int. Cl.
*H04R 5/04* (2006.01)
*H04R 25/00* (2006.01)
*G06K 9/00* (2006.01)

(52) U.S. Cl.
CPC ........... *H04R 5/04* (2013.01); *G06K 9/00221* (2013.01); *G06K 9/00832* (2013.01); *H04R 25/00* (2013.01); *G06K 2009/00322* (2013.01); *H04R 2499/13* (2013.01)

(58) Field of Classification Search
CPC ...... H04R 5/04; H04R 25/00; H04R 2499/13; G06K 9/00221; G06K 9/00832; G06K 2009/00322

USPC .......... 381/86, 100, 315; 382/103, 118, 159, 382/224
See application file for complete search history.

(56) References Cited

U.S. PATENT DOCUMENTS

| | | | |
|---|---|---|---|
| 2015/0365771 A1* | 12/2015 | Tehrani | B62D 63/00 381/315 |
| 2018/0101354 A1* | 4/2018 | Shintani | G06F 3/165 |
| 2018/0310100 A1* | 10/2018 | Raghavan | H04R 5/04 |
| 2020/0058222 A1* | 2/2020 | Miyahara | B60Q 1/503 |
| 2020/0066070 A1* | 2/2020 | Wells | G05D 1/0223 |

FOREIGN PATENT DOCUMENTS

JP    2010202086 A  *  9/2010

\* cited by examiner

*Primary Examiner* — Jason R Kurr
*Assistant Examiner* — Friedrich Fahnert

(57) ABSTRACT

An audio adjustment system for a vehicle includes a detection module that is configured to receive an image and detect a face of at least one of a passenger of the vehicle and a pedestrian near the vehicle. An age estimation module is configured to estimate an age of the at least one of the passenger and the pedestrian based on the detected face. An adjustment determination module is configured to determine an audio adjustment parameter for an audio signal based on the estimated age of the at least one of the passenger and the pedestrian.

18 Claims, 4 Drawing Sheets

AUDIO ADJUSTMENT SYSTEM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to determining an audio adjustment parameter for an audio generating system of a vehicle, and more particularly to a system and method for determining the audio adjustment parameter based on an estimated gender and estimated age of a passenger and/or a nearby pedestrian.

Individuals experience age-related hearing loss, or presbycusis, as they grow older. Typically, age-related hearing loss affects an individual's hearing at higher frequencies (e.g., greater than or equal to one kilohertz). As such, some individuals may not be able to perceive audio alerts or audio entertainment due to age-related hearing loss.

SUMMARY

An audio adjustment system for a vehicle includes a detection module that is configured to receive an image and detect a face of at least one of a passenger of the vehicle and a pedestrian nearby the vehicle. An age estimation module is configured to estimate an age of the at least one of the passenger and the pedestrian based on the detected face. An adjustment determination module is configured to determine an audio adjustment parameter for an audio signal based on the estimated age of the at least one of the passenger and the pedestrian.

In other features, a gender estimation module is configured to estimate a gender of the at least one of the passenger and the pedestrian based on the detected face. The adjustment determination module is further configured to determine the audio adjustment parameter for the audio signal based on the estimated gender of the at least one of the passenger and the pedestrian.

In other features, the adjustment determination module is further configured to send the audio adjustment parameter to an audio generating device that outputs the audio signal. The vehicle includes a plurality of sensors that are configured to detect presence of the at least one of the passenger and the pedestrian. The detection module determines a location of the at least one of the passenger and the pedestrian based on signals received from the plurality of sensors.

In other features, the audio signal corresponds to the location of the at least one of the passenger and the pedestrian. The plurality of sensors comprises at least one of a weight sensor, a seat belt sensor, a steering wheel sensor, an optical sensor, a lidar sensor, a radar sensor, and an audio sensor. The audio generating device comprises at least one of a radio, a noise management system, a safety indication system, a sound enhancement system and an infotainment system.

In other features, the audio adjustment parameter comprises at least one of increasing audio output at one or more frequencies of the audio signal; and shifting a pitch of a portion of the audio signal.

In other features, the adjustment parameters correspond to at least one of manual adjustments, adjustments for the estimated gender, and adjustments for the estimated age. The adjustment determination module is configured to reduce the audio adjustment parameter for the audio signal when a hearing aid with a wireless transceiver is located at least one of inside the vehicle and outside the vehicle.

A method for adjusting audio signals in a vehicle includes receiving an image and detecting a face of at least one of a passenger of the vehicle and a pedestrian near the vehicle; estimating an age of the at least one of the passenger and the pedestrian based on the detected face; and determining an audio adjustment parameter for an audio signal based on the estimated age of the at least one of the passenger and the pedestrian.

In other features, the method includes determining a gender of the at least one of the passenger and the pedestrian based on the detected face. Determining the audio adjustment parameter for the audio signal is further based on the estimated gender of the at least one of the passenger and the pedestrian.

In other features, the method includes sending the audio adjustment parameter to an audio generating system that adjusts and outputs the audio signals using the audio adjustment parameter. The method includes detecting presence of the at least one of the passenger and the pedestrian using one or more sensors. The method includes determining a location of the at least one of the passenger and the pedestrian based on signals received from the one or more sensors.

In other features, the audio signals correspond to the location of the at least one of the passenger and the pedestrian. The one or more sensors are selected from a group consisting of a weight sensor, a seat belt sensor, a radar sensor, a lidar sensor, a steering wheel sensor, an optical sensor, and an audio sensor. The audio generating device comprises at least one of a radio system, a noise management system, a safety indication system, a sound enhancement system and an infotainment system.

In other features, the audio adjustment parameter comprises at least one of increasing audio output at one or more frequencies and shifting a pitch of a portion of the audio signals. The adjustment parameters correspond to at least one of manual adjustments, adjustments for the estimated gender, and adjustments for the estimated age.

In other features, the method includes reducing the audio adjustment parameter for the audio signal when a hearing aid with a wireless transceiver is located at least one of inside the vehicle and outside the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Passengers of vehicles may not perceive audio alerts (such as safety chimes), phone calls, and/or audio entertainment such as music or podcasts as intended by the manufacturer due to age-related hearing loss. Similarly, pedestrians located near the vehicle may not perceive external audible alerts and/or synthesized vehicle sounds as intended by the manufacturer due to age-related hearing loss. Typically, age-related hearing loss affects an individual's ability to perceive audio signals at higher frequencies.

The present disclosure is directed to systems and methods for determining an audio adjustment parameter for one or more internal and/or external audio generating systems of the vehicle based on an estimated gender and age of passengers and/or nearby pedestrians. In some examples, the audio adjustment system may also determine whether or not a passenger or nearby pedestrian is wearing a hearing aid. If a hearing aid is detected, the adjustments are reduced or eliminated. The audio adjustment parameter may then be provided to one or more audio generating systems outputting audio signals (within the vehicle and/or outside of the vehicle). The audio adjustment parameters are used to adjust the audio signals.

In some examples, the system can include a detection module that is configured to receive an image (from within the vehicle or outside of the vehicle) and to detect a face of a passenger or pedestrian in the image. A gender estimation module is configured to estimate a gender of the passenger and/or pedestrian based on the detected face. In an example implementation, the detection module receives images from one or more internal and/or external image capture devices. The system can also include an age estimation module that is configured to estimate an age of the passenger and/or pedestrian based on the detected face.

An adjustment determination module is configured to determine an audio adjustment parameter based on the estimated gender and age of the passenger(s) and/or pedestrian(s). The audio adjustment parameter is output to one or more audio generating devices of the vehicle to adjust the audio output according to the audio adjustment parameter.

Figure 1:
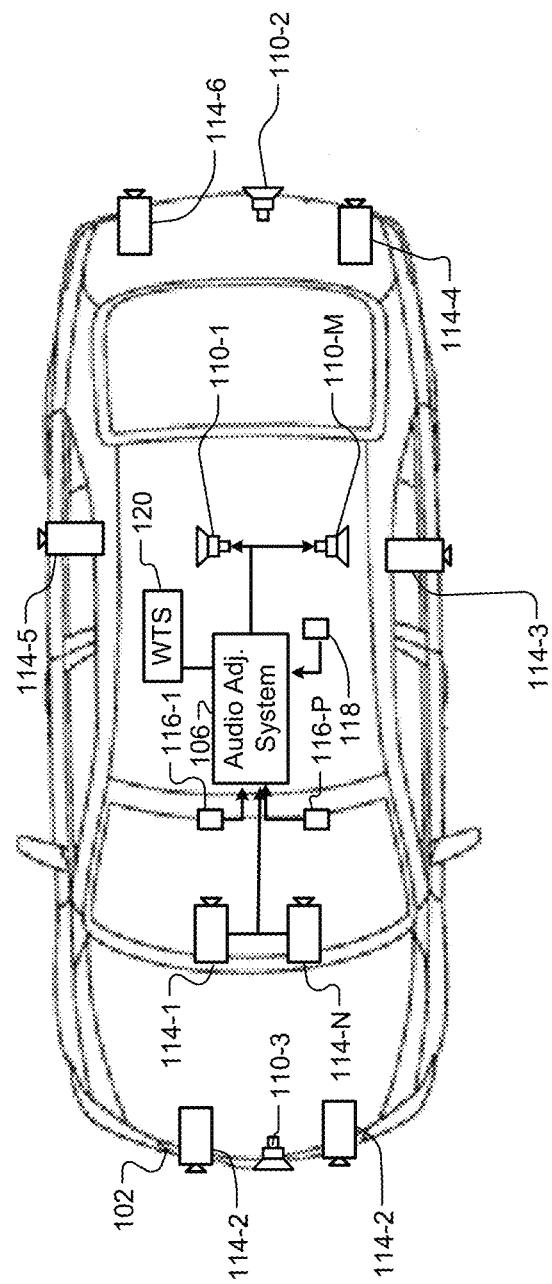
FIG. 1 is diagrammatic illustration of a vehicle including an audio adjustment system in accordance with an example implementation of the present disclosure.

FIG. 1 illustrates a vehicle 102 in accordance with an example implementation of the present disclosure. As shown, the vehicle 102 includes an audio adjustment system 106 that adjusts one or more audio signal parameters of audio generating devices 110-1 through 110-M of the vehicle 102 (where M is an integer greater than or equal to 1) based on an estimated gender and age of one or more passengers and/or nearby pedestrians. For example, the audio signal parameters can include, but are not limited to, an audio gain parameter, an audio frequency parameter, and/or an audio pitch parameter.

In one or more implementations, the audio adjustment system 106 generates an audio adjustment signal that adjusts the audio gain parameter, the audio frequency parameter, and/or the audio pitch parameter based on the estimated gender and/or age of the passenger within the vehicle 102 and/or nearby pedestrians. The audio adjustment system 106 can provide the audio adjustment signal to the one or more audio generating devices 110-1 through 110-M of the vehicle 102. The audio generating devices 110-1 to 110-M can include, but are not limited to, radio systems, noise management systems, safety indication systems, and infotainment systems that generate audio signals inside and/or outside of the vehicle.

For example, for phone audio applications, higher pitch voices may be harder to perceive without sound audio adjustment. In hybrid vehicles, pure electric vehicles and/or other applications, sound enhancement may be used to mask and/or enhance electric motor sounds (e.g., for enhanced customer experience inside of the vehicle and/or for safety outside of the vehicle). Without audio adjustment described herein, the passenger and/or pedestrian may not be able to hear the enhancement. Some passengers may not be able to hear vehicle chimes or may perceive the wrong meaning from the vehicle chimes without audio adjustment described herein. For example, the passengers may not be able to hear music as intended by the artist. Some pedestrians may not be able to hear safety sounds emitted by hybrid or electric vehicles.

As described in greater detail herein, the audio adjustment system 106 receives image signals from one or more image capture devices 114-1. 114-2, . . . , and 114-N (collectively image capture devices 114) where N is an integer greater than or equal to 1. Some of the image capture devices 114 generate video signals of passengers located inside of the vehicle 102. Other ones of the image capture devices 114 are directed outside of the vehicle and generate video signals of nearby pedestrians who are located outside of the vehicle.

The image capture devices 114-1 through 114-N may collect still and/or video images of one or more passengers within the vehicle 102 and/or pedestrians located outside of the vehicle. Images collected by the image capture devices 114-1 through 114-N may be provided to the audio adjustment system 106, for example, using wired or wireless connections. For example, images may be provided using a communications cable, a wireless connection or a combination thereof.

The vehicle 102 can include one or more sensors 116-1 through 116-P, where P is an integer greater than or equal to 1. The one or more sensors 116-1 through 116-P can be located inside the vehicle to sense passengers and/or can be located outside of the vehicle to sense pedestrians. The one or more sensors 116-1 through 116-P can detect the presence or absence of one or more passengers within the vehicle 102 or pedestrians near the vehicle and provide a signal indicative of the presence or absence to the audio adjustment system 106. The sensors 116-1 through 116-P can include, but are not limited to, weight sensors, optical sensors, seat belt sensors, radar sensors, lidar sensors, steering wheel sensors (e.g. hands on or off detection) or audio sensors.

The vehicle 102 can also include a user interface 118 to allow passenger preferences to be set for the audio adjustment system 106. For example, one or more passengers of the vehicle 102 may initiate or terminate operation of the audio adjustment system 106 by setting preferences using the user interface 118. In another example, one or more passengers of the vehicle 102 may manually adjust one or more audio signal parameters via the user interface 118. For instance, one or more passengers may manually adjust and/or set default scaling and/or values for the audio gain parameter, the audio frequency parameter, and/or the audio pitch parameter via the user interface 118. In still other examples, audio adjustment parameters can be set specifically for users wearing a hearing aid. For example, scaling of the audio adjustment parameters can be performed when a hearing aid is detected to prevent overlapping adjustments.

In some examples, the vehicle 102 may include a wireless transceiver system (WTS) 120 including one or more wireless transceivers 121-1 through 121-B (FIG. 2) (collectively wireless transceivers 121), where B is an integer greater than or equal to one. In some examples, the wireless transceivers 121 include Bluetooth transceivers, although other wireless transceivers can be used. In some examples, the wireless transceivers 121 are arranged in different locations of the vehicle. In some examples, the wireless transceivers 121 can be used to determine the location of the person wearing the hearing aid 125. For example, directions and/or strengths of signals received by the wireless transceivers 121 can be used to triangulate the location of the person wearing the hearing aid 125. In some examples, the wireless transceiver system (WTS) 120 and the wireless transceivers 121 are also used to establish links with Bluetooth devices such as key fobs to allow keyless entry, turning on accessories or ignition, enabling of a start/stop button and/or other vehicle functions.

In some examples, operation of the audio adjustment system 106 makes further adjustments when a passenger or pedestrian located near the vehicle 102 is wearing a hearing aid 125 (FIG. 2) with wireless connectivity capability. In some examples, audio adjustment settings stored in the hearing aid (and transmitted to the audio adjustment system 106) and/or stored in the audio adjustment system 106 partially reduce the audio adjustment by the audio adjustment system 106 in response to detection of a passenger with the hearing aid 125. In other examples, audio adjustment settings stored in the hearing aid (and transmitted to the audio adjustment system 106) and/or stored in the audio adjustment system 106 eliminate the audio adjustment by the audio adjustment system 106 in response to detection of a passenger with the hearing aid 125.

Figure 2:
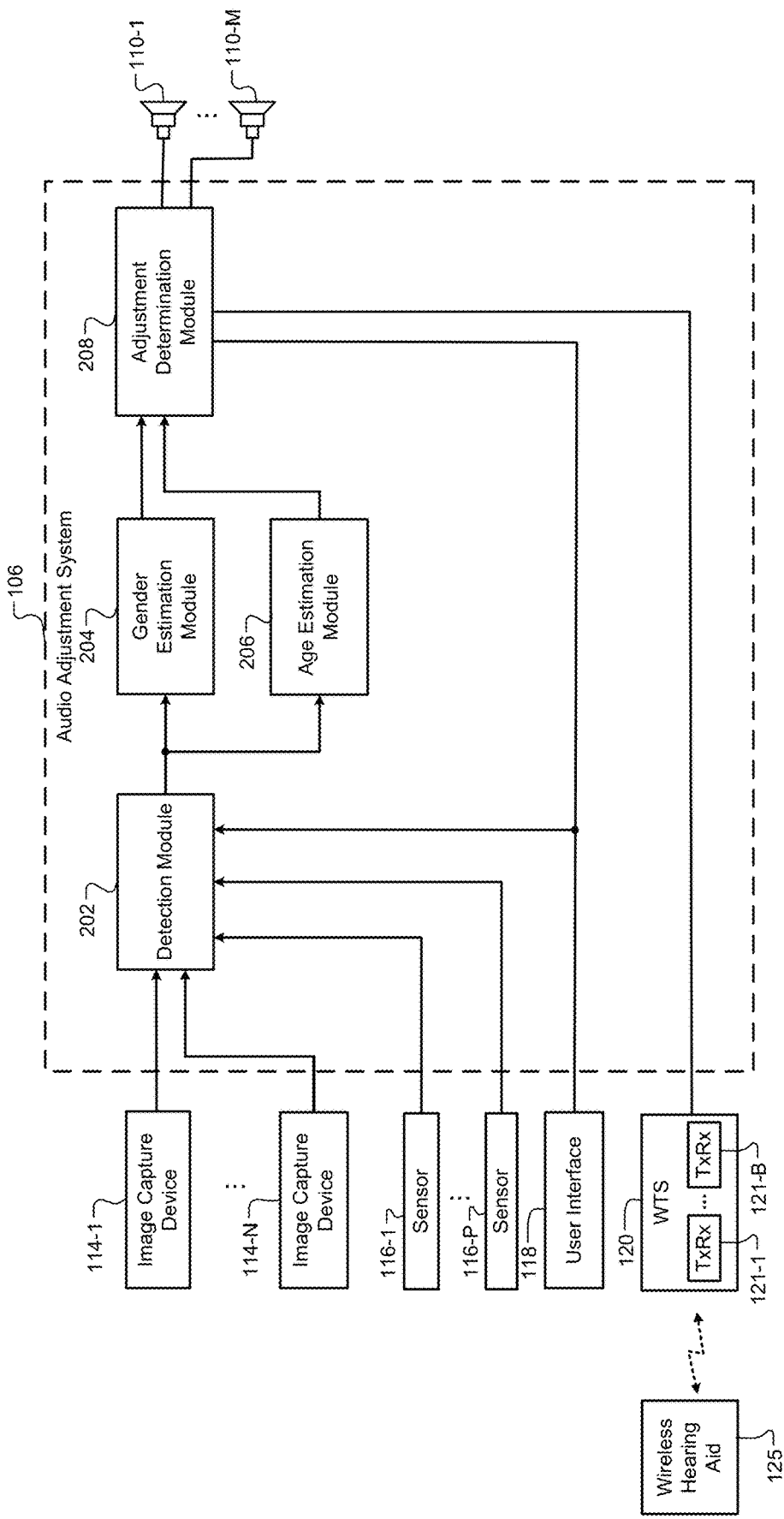
FIG. 2 is block diagram illustrating the audio adjustment system in accordance with an example implementation of the present disclosure.

FIG. 2 illustrates an example audio adjustment system 106. The audio adjustment system 106 includes a detection module 202, a gender estimation module 204, an age estimation module 206, and an adjustment determination module 208.

The detection module 202 receives the image from the image capture devices 114-1 to 114-N and detects a face of the passenger and/or pedestrian within the received image. In an example implementation, the detection module 202 applies one or more object detection techniques to the image to detect faces of the passengers within the image for internal-facing cameras (or nearby pedestrians within the image for external-facing cameras). For example, the detection module 202 may use Viola-Jones object detection techniques to detect faces within the image. Once the detection module 202 detects one or more faces within the image, the detection module 202 provides signals indicative of the detected faces to the gender estimation module 204 and the age estimation module 206.

The detection module 202 may also associate the detected face with a location within the vehicle 102 (e.g., driver's seat, passenger front seat, etc.). In an implementation, the image detection module 202 may associate the detected face with the location within the vehicle 102 based on the image capture device 114-1 through 114-N providing the image. For example, the image capture device 114-1 may be oriented within the vehicle 102 to only capture images of passengers within the driver's seat and the other image capture devices 114-2 through 114-N may be oriented to only capture images of passengers in a particular location of the vehicle 102. The detection module 202 may also determine the location of the passengers based the signals indicative of the presence or the absence of the passenger and/or pedestrian received from the sensors 116-1 through 116-P. Alternately, outward-facing image capture devices 116 may associate the images with a particular location outside of the vehicle 102 (e.g. front, front left, left, right, front right, rear left, rear right and rear).

In another implementation, the detection module 202 may determine the location of the passenger within the vehicle 102 based on the detected presence or absence of objects within the image of the passenger. For instance, the detection module 202 may determine that the passenger is in the driver's seat based on the presence of a steering wheel within the image.

The gender estimation module 204 receives signals indicative of the detected faces and/or associated locations from the detection module 202 and estimates a gender of the passenger and/or pedestrian based on the detected face. In an implementation, the gender estimation module 204 estimates the gender of the passenger and/or pedestrian using one or more classification techniques. For example, the gender estimation module 204 may use binary classifiers that have been trained using ground truth data of gender groups. Ground truth data may be generated, for example, using images of different individuals that are labeled by humans and/or computers with indications of the corresponding individual's gender.

In some implementations, the images may be sorted into various gender groups for training. For example, images may be sorted into a male group and a female group. The images may be further sorted into data sets used for training and testing. For example, a percentage of the images may be used for training, and the remaining images may be used for testing.

The gender estimation module 204 can generate a confidence value that the image depicts a passenger and/or pedestrian of a particular gender. For example, the gender estimation module 204 can generate a confidence value (e.g., 0.75) indicating a greater confidence that the passenger and/or pedestrian is male. In some implementations, the gender estimation module 204 may implement one or more different classifiers for generating confidence values.

In an implementation, the gender estimation module 204 can apply one or more regression techniques to the confidence values to determine the gender of the passenger and/or pedestrian. For example, the gender estimation module 204 may aggregate confidence values generated by the classifiers into a vector and map the vector into a scalar value to classify the gender of the passenger and/or pedestrian.

The gender estimation module 204 generates a signal indicative of the estimated gender of the passenger and/or pedestrian based on the confidence value. The signal indicative of the estimated gender is provided to the adjustment determination module 208.

The age estimation module 206 receives the images and/or associated locations from the detection module 202 and estimates an age of the passenger and/or pedestrian based on the received images. In an implementation, the age estimation module 206 determines the gender of the passenger and/or pedestrian using one or more classification techniques. For example, the age estimation module 206 may use classifiers that have been trained using ground truth data of a person's age. For example, the age estimation module 206 may use binary classifiers. Ground truth data may be generated, for example, using images of different individuals that are labeled by humans and/or computers with indications of the corresponding individual's age.

In some implementations, the images may be sorted into various age groups for training. For example, images may be sorted into images of individuals having the same age or similar age (e.g., within two years of one another). The images may be further sorted into data sets used for training and testing. For example, a percentage of the images may be used for training, and the remaining images may be used for testing.

The age estimation module 206 can generate a confidence value that the image depicts a passenger and/or pedestrian of a particular age. For example, the age estimation module 206 can generate a confidence value indicating a greater confidence that the passenger and/or pedestrian is a particular age. In some implementations, the age estimation module 206 may implement one or more different classifiers for generating confidence values.

Once the age estimation module 206 determines the confidence value that the passenger and/or pedestrian is a particular age, the age estimation module 206 applies one or more regression techniques to the confidence values to estimate the age of the passenger and/or pedestrian. For example, the age estimation module 206 may combine confidence values generated by the classifiers into a vector and map the vector into a scalar value to estimate the age of the passenger and/or pedestrian. The age estimation module 206 generates a signal indicative of the estimated age of the passenger and/or pedestrian and provides the signal to the adjustment determination module 208.

The adjustment determination module 208 generates an audio adjustment signal based on the received estimated age signal and the received estimated gender signal. The audio adjustment signal is indicative of an audio adjustment parameter for adjusting the audio of the audio generating devices 110-1 through 110-M. The adjustment determination module 208 may determine the audio adjustment parameter, for example, via manual adjustment from a user or using one or more lookup tables that relate the estimated age and estimated gender of the passenger and/or pedestrian to an audio adjustment parameter that compensates for gender/age-related hearing loss. The audio adjustment parameter can include, but is not limited to increasing sound levels at certain frequencies or frequency ranges and/or pitch shifting. In some examples, the lookup table may be preprogrammed with audio adjustment parameters based on gender and age. Alternately, in other examples, a user is able to manually select audio adjustment levels for specific frequency bands by adjusting up or down within predetermined limits.

The adjustment determination module 208 may also generate the audio adjustment signal based on signals received from the user interface 118. For example, the passenger and/or pedestrian may input the passenger's age and gender via the user interface 118. Based on the received input, the adjustment determination module 208 can determine the audio adjustment parameter using the lookup table.

Figure 3B:
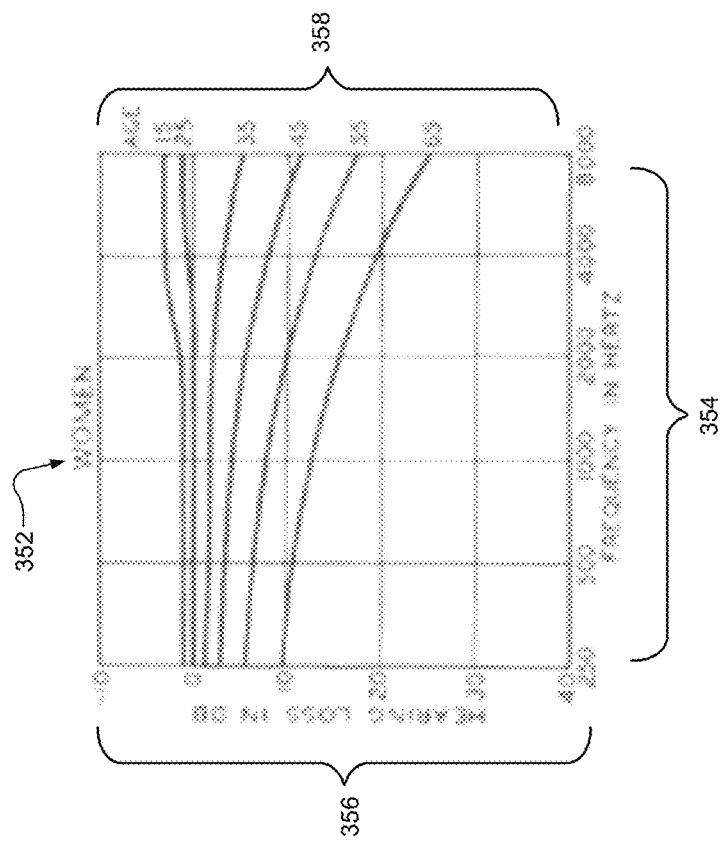
FIG. 3B is a graph illustrating female hearing loss as a function of age.
Figure 3A:
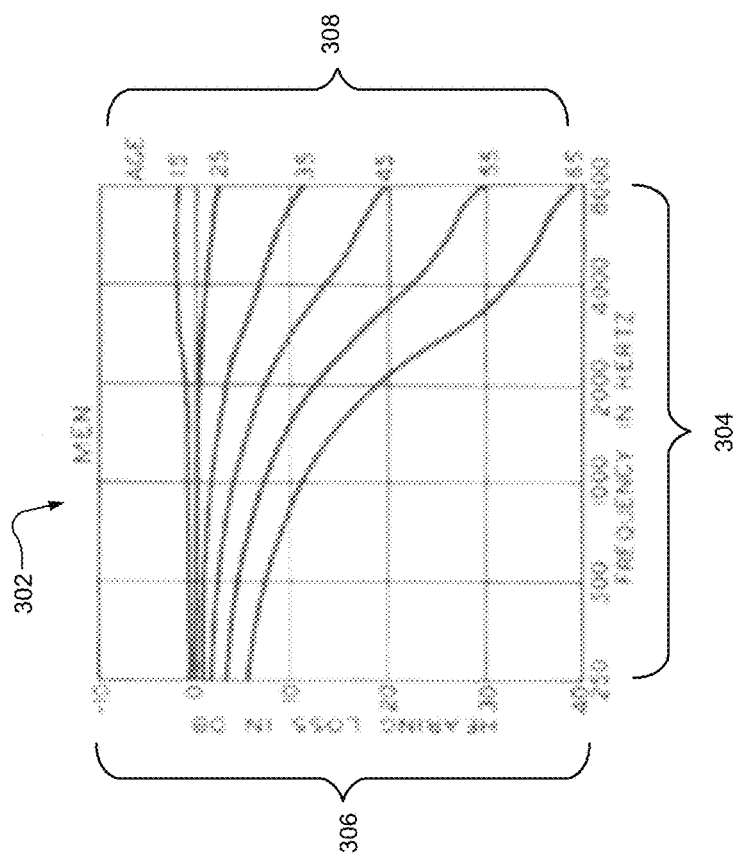
FIG. 3A is a graph illustrating male hearing loss as a function of age.

FIG. 3A is an example graph 302 illustrating hearing loss in males. FIG. 3B is an example graph 352 illustrating hearing loss in females. While specific graphs are shown, other graphs can be used. The x-axis 304 represents frequency measured in hertz (Hz), the first y-axis 306 represents hearing loss measured in decibels (dBs), and the second y-axis 308 represents age measured in years. The x-axis 354 represents frequency measured in hertz (Hz), the first y-axis 356 represents hearing loss measured in decibels (dBs), and the second y-axis 358 represents age measured in years. In an example implementation, the lookup table of the adjustment determination module 208 can include predetermined audio adjustment parameters that correspond to gender and age. In some examples, the lookup table may be preprogrammed with audio adjustment parameters based on gender and age. Alternately, in other examples, a user is able to manually select audio adjustment for specific frequency bands.

The adjustment determination module 208 sends the audio adjustment signal to the audio generating devices 110-1 through 110-N. The adjustment generating devices 110-1 through 110-N adjust the audio output based on the audio adjustment signal. In one or more implementations, the adjustment determination module 208 sends the audio adjustment signal corresponding to the passenger and/or pedestrian to the audio generating devices 110-1 through 110-N based on the location of the passenger and/or pedestrian. For example, a first audio generating device 110-1 may be located near the driver's seat, and a second audio generating device 110-2 may be located near the passenger's seat.

Figure 4:
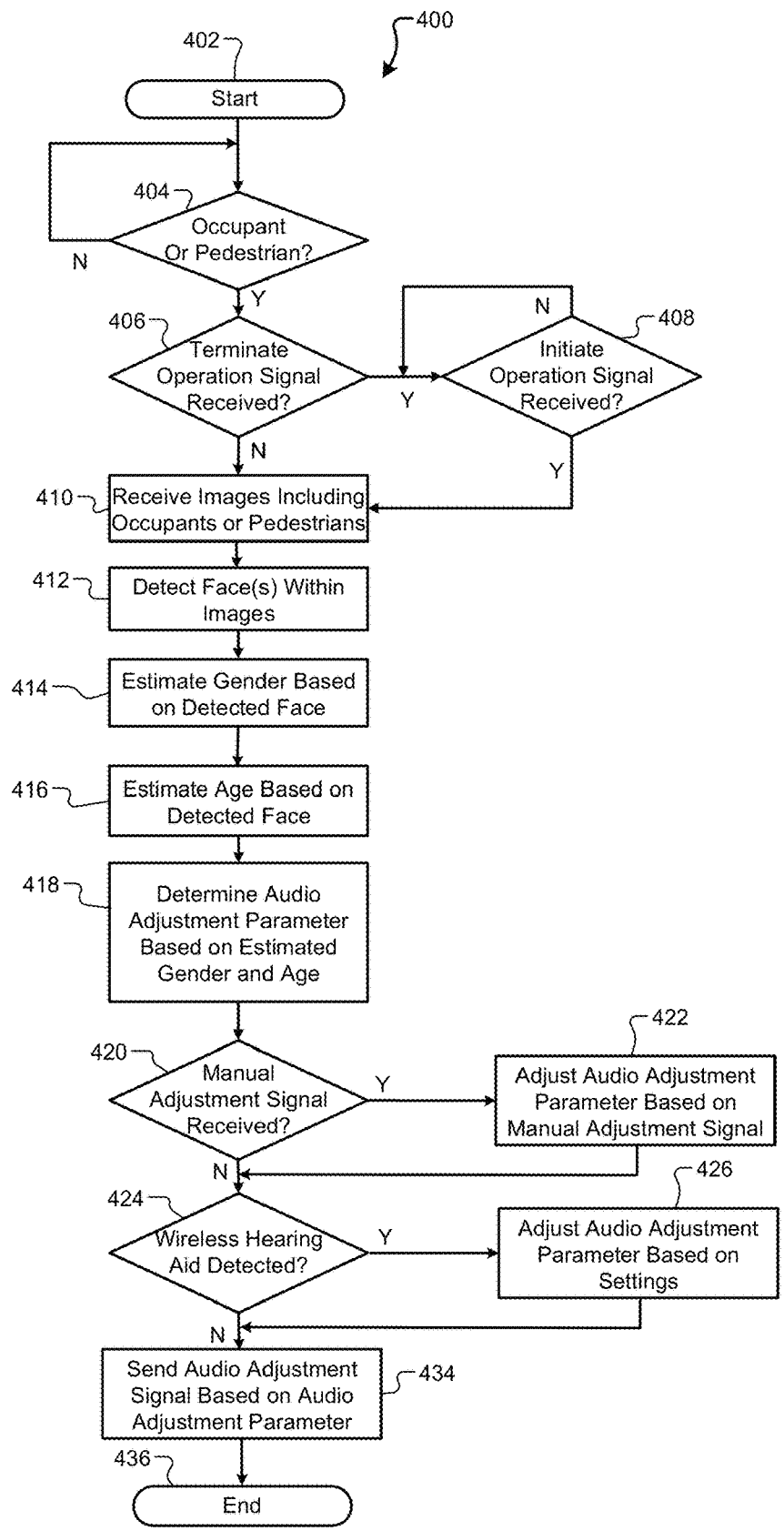
FIG. 4 is a flow diagram illustrating an example method for determining an audio adjustment parameter according to an example implementation of the present disclosure.

FIG. 4 illustrates an example method 400 for determining an audio adjustment signal based on the estimated gender and estimated age of one or more passengers and/or pedestrians. The method 400 is described in the context of the modules included in the example implementation of the audio adjustment system 106 shown in FIGS. 1 and 2. However, the particular modules that perform the steps of the method may be different than those mentioned below and/or the method may be implemented apart from the modules of FIGS. 1 and 2.

The method 400 begins at 402. At 404, the detection module 202 determines whether a signal indicative of the presence of one or more passengers has been received. The method 400 returns to 404 if no signal has been received. If the signal indicative of the presence of one or more passengers has been received, the detection module 202 can determine whether the passenger has terminated operation of the audio adjustment system 106 at 406. If the passenger has terminated operation, the detection module 202 can determine whether the passenger has initiated operation at 408. If the passenger has not initiated operation, the method 400 returns to 408. If the passenger has initiated operation, the method 400 transitions to 410.

At 410, the detection module 202 receives one or more images indicative of passengers within the vehicle 102 or pedestrians outside of the vehicle. At 412, the detection module 202 detects faces within the received images. In some implementations, the detection module 202 may determine a location of the passenger within the vehicle 102 or relative location of the pedestrian outside of the vehicle 102. At 414, the gender estimation module 204 determines the gender of the passenger and/or the pedestrian based on the detected face. The age estimation module 206 estimates the age of the passenger and/or the pedestrian based on the detected face at 416.

At 418, the adjustment determination module 208 determines the audio adjustment parameter based on the estimated gender and estimated age of the passenger and/or pedestrian. At 420, the adjustment determination module 208 determines whether the passenger has provided a manual adjustment signal. If the passenger has provided the manual adjustment signal, the adjustment determination module 208 adjusts the determined audio adjustment parameter based on the manual adjustment signal at 422.

At 424, the adjustment determination module 208 determines whether the wireless transceiver system 120 detects a hearing aid inside the vehicle (or a hearing aid worn by a nearby pedestrian). If 424 is true, the audio adjustment parameters are adjusted to account for the passenger and/or pedestrian wearing the hearing aid. For example, if a passenger in the driver side rear seat is wearing a hearing aid, then the adjustment determination module 208 may alter or reduce the adjustment to the audio signals output by the infotainment system to the driver side rear seat speakers or all of the speakers by 25%, 50%, 75%, 100% or another value. Whereas, if a pedestrian is located in the front of the vehicle, audio signals output outside of the vehicle can be adjusted. If one or more external speakers are used, the audio signal that is adjusted corresponds to a speaker near the pedestrian. Otherwise, if no hearing aids are detected (either inside the vehicle or worn by nearby pedestrians), the method proceeds from 424 to 434.

At 434, the adjustment determination module 208 sends the determined audio adjustment parameter to corresponding ones of the audio generating devices 110-1 through 110-M. In some implementations, the adjustment determination module 208 sends the determined audio adjustment parameters to the audio generating devices 110-1 through 110-M proximate to the passenger (or for the entire vehicle) based on the determined location of the passenger in the vehicle 102. In some implementations, the adjustment determination module 208 sends the determined audio adjustment parameters to the audio generating devices 110-1 through 110-M proximate to the pedestrian based on the determined location of the pedestrian outside of the vehicle 102. The method 400 ends at 436.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An audio adjustment system for a vehicle, comprising:
a detection module that is configured to receive an image and detect a face of at least one of a passenger of the vehicle and a pedestrian nearby the vehicle;
an age estimation module that is configured to estimate an age of the at least one of the passenger and the pedestrian based on the detected face;
a gender estimation module that is configured to estimate a gender of the at least one of the passenger and the pedestrian based on the detected face; and
an adjustment determination module that is configured to determine an audio adjustment parameter for an audio signal based on the estimated age and the estimated gender of the at least one of the passenger and the pedestrian.

2. The audio adjustment system as recited in claim 1, wherein the adjustment determination module is further configured to send the audio adjustment parameter to an audio generating device that outputs the audio signal.

3. The audio adjustment system as recited in claim 2, wherein the vehicle includes a plurality of sensors that are configured to detect presence of the at least one of the passenger and the pedestrian.

4. The audio adjustment system as recited in claim 3, wherein the detection module determines a location of the at least one of the passenger and the pedestrian based on signals received from the plurality of sensors.

5. The audio adjustment system as recited in claim 4, wherein the audio signal corresponds to at least one of the passenger and the pedestrian.

6. The audio adjustment system as recited in claim 4, wherein the plurality of sensors comprises at least one of a weight sensor, a seat belt sensor, a lidar sensor, a radar sensor, a steering wheel sensor, an optical sensor, and an audio sensor.

7. The audio adjustment system as recited in claim 2, wherein the audio generating device comprises at least one a radio, a noise management system, a safety indication system, a sound enhancement system and an infotainment system.

8. The audio adjustment system as recited in claim 1, wherein the audio adjustment parameter comprises at least one of:
increasing audio output at one or more frequencies of the audio signal; and
shifting pitch of a portion of the audio signal.

9. The audio adjustment system as recited in claim 1, wherein the audio adjustment parameter corresponds to at least one of a manual adjustment, an adjustment for the estimated gender, and an adjustment for the estimated age.

10. The audio adjustment system of claim 1, wherein the adjustment determination module is configured to reduce the audio adjustment parameter for the audio signal when a hearing aid with a wireless transceiver is located at least one of inside the vehicle and outside the vehicle.

11. A method for adjusting audio signals in a vehicle, comprising:
receiving an image and detecting a face of at least one of a passenger of the vehicle and a pedestrian near the vehicle;
estimating an age of the at least one of the passenger and the pedestrian based on the detected face;
estimating a gender of the at least one of the passenger and the pedestrian based on the detected face; and
determining an audio adjustment parameter for an audio signal based on the estimated age and the estimated gender of the at least one of the passenger and the pedestrian.

12. The method as recited in claim 11, further comprising sending the audio adjustment parameter to an audio generating device that adjusts and outputs the audio signals using the audio adjustment parameter.

13. The method as recited in claim 12, further comprising detecting presence of the at least one of the passenger and the pedestrian using one or more sensors.

14. The method as recited in claim 13, further comprising determining a location of the at least one of the passenger and the pedestrian based on signals received from the one or more sensors.

15. The method as recited in claim 14, wherein the audio signals correspond to the location of the at least one of the passenger and the pedestrian.

16. The method as recited in claim 14, wherein:
the one or more sensors are selected from a group consisting of a weight sensor, a seat belt sensor, a radar sensor, a lidar sensor, a steering wheel sensor, an optical sensor, and an audio sensor, and
the audio generating device comprises at least one of a radio system, a noise management system, a safety indication system, a sound enhancement system and an infotainment system.

17. The method as recited in claim 11, wherein the audio adjustment parameter comprises at least one of:
increasing audio output at one or more frequencies; and
pitch shifting.

18. The method as recited in claim 11, further comprising reducing the audio adjustment parameter for the audio signal when a hearing aid with a wireless transceiver is located at least one of inside the vehicle and outside the vehicle.

* * * * *